US009731622B2

(12) United States Patent
Rawlinson

(10) Patent No.: US 9,731,622 B2
(45) Date of Patent: *Aug. 15, 2017

(54) EV BATTERY PACK MULTI-MODE COOLING SYSTEM

(71) Applicant: Atieva, Inc., Redwood City, CA (US)

(72) Inventor: Peter Dore Rawlinson, Worcestershire (GB)

(73) Assignee: ATIEVA, INC., Menlo Park, CA (US)

( * ) Notice: Subject to any disclaimer, the term of this patent is extended or adjusted under 35 U.S.C. 154(b) by 730 days.

This patent is subject to a terminal disclaimer.

(21) Appl. No.: 14/149,116

(22) Filed: Jan. 7, 2014

(65) Prior Publication Data

US 2015/0191101 A1 Jul. 9, 2015

Related U.S. Application Data

(63) Continuation of application No. 14/148,933, filed on Jan. 7, 2014.

(51) Int. Cl.
| | |
|---|---|
| H01M 10/6568 | (2014.01) |
| H01M 10/625 | (2014.01) |
| H01M 10/6556 | (2014.01) |
| B60L 11/18 | (2006.01) |
| B60L 1/00 | (2006.01) |
| B60L 1/02 | (2006.01) |
| H01M 10/66 | (2014.01) |
| B60H 1/00 | (2006.01) |

(52) U.S. Cl.
CPC ...... *B60L 11/1874* (2013.01); *B60H 1/00278* (2013.01); *B60L 1/003* (2013.01); *B60L 1/02* (2013.01); *B60L 11/1879* (2013.01); *H01M 10/625* (2015.04); *H01M 10/6556* (2015.04); *H01M 10/6568* (2015.04); *H01M 10/66* (2015.04); *B60H 2001/00307* (2013.01); *B60L 2240/545* (2013.01); *B60L 2240/662* (2013.01); *B60L 2250/10* (2013.01); *H01M 2220/20* (2013.01); *Y02T 10/7005* (2013.01); *Y02T 10/705* (2013.01); *Y02T 10/7291* (2013.01); *Y02T 90/16* (2013.01)

(58) Field of Classification Search
CPC . H01M 10/60; B60L 11/1874; B60H 1/00278
USPC .................................................. 429/120, 62
See application file for complete search history.

(56) References Cited

U.S. PATENT DOCUMENTS

| | | | | | |
|---|---|---|---|---|---|
| 2011/0262794 | A1* | 10/2011 | Yoon | ................... | H01M 10/486 429/120 |
| 2014/0193683 | A1* | 7/2014 | Mardall | .............. | H01M 2/1077 429/99 |

* cited by examiner

*Primary Examiner* — James Lee
(74) *Attorney, Agent, or Firm* — Patent Law Office of David G. Beck

(57) ABSTRACT

A multi-mode thermal management system is provided for use with the battery pack of an electric vehicle, the system utilizing the surface area of the battery pack to remove battery pack heat. The system includes two sets of coolant conduits separated by a thermal insulator, with one set of the coolant conduits thermally coupled to the batteries and the other set of coolant conduits coupled to at least one thermally conductive battery pack surface. A valve controller is used to optimize system performance by coupling the battery cooling conduits to the battery pack heat withdrawal conduits and/or a separate radiator and/or a heat exchanger coupled to a refrigeration subsystem.

28 Claims, 10 Drawing Sheets

EV BATTERY PACK MULTI-MODE COOLING SYSTEM

CROSS-REFERENCE TO RELATED APPLICATION

This application is a continuation of U.S. patent application Ser. No. 14/148,933, filed 7 Jan. 2014, the disclosure of which is incorporated herein by reference for any and all purposes.

FIELD OF THE INVENTION

The present invention relates generally to electric vehicles and, more particularly, to a multi-mode cooling system for use with an undercarriage mounted battery pack.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

Electric vehicles, due to their reliance on rechargeable batteries, require a relatively sophisticated thermal management system to insure that the batteries remain within their desired operating temperature range while still providing adequate heating and cooling within the passenger cabin and not unduly affecting the vehicle's overall operating efficiency. A variety of approaches have been taken to try and meet these goals. For example, U.S. Pat. No. 6,360,835 discloses a thermal management system for use with a fuel-cell-powered vehicle, the system utilizing both low and high temperature heat transfer circuits that share a common heat transfer medium, the dual circuits required to adequately cool the vehicle's exothermic components and heat the vehicle's endothermic components.

U.S. Pat. No. 7,789,176 discloses a thermal management system that utilizes multiple cooling loops and a single heat exchanger. In an exemplary embodiment, one cooling loop is used to cool the energy storage system, a second cooling loop corresponds to the HVAC subsystem, and a third cooling loop corresponds to the drive motor cooling system. The use of a heater coupled to the first cooling loop is also disclosed, the heater providing a means for insuring that the batteries are warm enough during initial vehicle operation or when exposed to very low ambient temperatures.

U.S. Pat. No. 8,336,319 discloses an EV dual mode thermal management system designed to optimize efficiency between two coolant loops, the first cooling loop in thermal communication with the vehicle's batteries and the second cooling loop in thermal communication with at least one drive train component such as an electric motor or an inverter. The disclosed system uses a dual mode valve system to configure the thermal management system between a first mode and a second mode of operation, where in the first mode the two cooling loops operate in parallel and in the second mode the two cooling loops operate in series.

Although the prior art discloses numerous techniques for cooling the battery pack of an electric vehicle, an improved thermal management system is needed that is capable of maintaining the batteries within their desired operating temperature range while still providing means for optimizing overall vehicle operating efficiency. The present invention provides such a thermal management system.

SUMMARY OF THE INVENTION

The present invention provides an electric vehicle multi-mode thermal management system that takes advantage of the surface area of the battery pack as a means of removing battery heat. The system utilizes (i) a first plurality of conduits that are adjacent to, and thermally coupled to, the batteries contained within the electric vehicle's battery pack; (ii) a second plurality of conduits thermally coupled to at least one thermally conductive surface of the battery pack enclosure; (iii) a thermal insulator interposed between the first and second pluralities of conduits; (iv) a radiator that is mounted to the vehicle and that is remotely located relative to the battery pack enclosure, i.e., the vehicle-mounted radiator is not mounted within or directly to the battery pack; and (v) a valve controller that has at least a first valve setting and a second valve setting, where the first valve setting couples the first plurality of conduits to the second plurality of conduits and allows coolant within the first plurality of conduits to flow through the second plurality of conduits, where the first valve setting decouples the first plurality of conduits from the radiator, where the second valve setting couples the first plurality of conduits to the second plurality of conduits and allows coolant within the first plurality of conduits to flow through the second plurality of conduits, and where the second valve setting couples the first plurality of conduits to the radiator and allows coolant within the first plurality of conduits to flow through the radiator. The second valve setting may also modify coolant flow from the first plurality of conduits through the second plurality of conduits. The valve controller may be configured to include a third valve setting, where the third valve setting couples the first plurality of conduits to the radiator and allows coolant within the first plurality of conduits to flow through the radiator, and where the third valve setting decouples the first plurality of conduits from the second plurality of conduits.

The thermal insulator may be comprised of a material (e.g., a gas such as air or a solid layer of material) with a thermal conductivity of less than $1.0\ \mathrm{Wm^{-1}K^{-1}}$ at 25° C. The first plurality of conduits may be positioned between adjacent rows of batteries within the battery pack, or interposed between the batteries and the thermal insulator. The second plurality of conduits may be adjacent to, or incorporated within, an exterior wall of the battery pack, where the thermally conductive surface of the battery pack enclosure corresponds to the exterior surface of the exterior wall of the battery pack. The second plurality of conduits may be configured to deform and absorb impact energy when an object strikes the thermally conductive surface of the battery pack enclosure.

In another aspect, the system may also include a refrigeration subsystem and a heat exchanger, where the refrigeration subsystem is coupled to the heat exchanger. The refrigeration subsystem may be configured to include a refrigerant, a compressor, a condenser and a thermostatic expansion valve. The refrigeration subsystem may be coupled to the vehicle's HVAC subsystem. The valve controller may be configured to include a third valve setting, where the third valve setting couples the first plurality of conduits to the heat exchanger and allows coolant within the first plurality of conduits to flow through the heat exchanger, where the refrigeration subsystem is in thermal communication with the coolant within the first plurality of conduits via the heat exchanger when the valve controller is in the third valve setting.

In another aspect, the system may also include a refrigeration subsystem and a heat exchanger, where the refrigeration subsystem is coupled to the heat exchanger and where the coolant within the first plurality of conduits flows through the heat exchanger. The refrigeration subsystem may be configured to include a refrigerant, a compressor, a condenser and a thermostatic expansion valve. The refrigeration subsystem may be coupled to the vehicle's HVAC subsystem. The valve controller may be configured to include a third valve setting, where the third valve setting increases the flow rate of a refrigeration subsystem refrigerant through the heat exchanger. The third valve setting may also be configured to (i) couple the first plurality of conduits to the second plurality of conduits and allow coolant within the first plurality of conduits to flow through the second plurality of conduits, (ii) decouple the first plurality of conduits from the second plurality of conduits, (iii) couple the first plurality of conduits to the radiator and allow coolant within the first plurality of conduits to flow through the radiator, and/or (iv) decouple the first plurality of conduits from the radiator.

In another aspect, the system may also include a refrigeration subsystem and a heat exchanger, where the refrigeration subsystem is coupled to the heat exchanger and where the coolant within the first plurality of conduits flows through the heat exchanger. The refrigeration subsystem may be configured to include a refrigerant, a compressor, a condenser and a thermostatic expansion valve. The refrigeration subsystem may be coupled to the vehicle's HVAC subsystem. The valve controller may be configured to include a third valve setting, where the third valve setting decreases the flow rate of a refrigeration subsystem refrigerant through the heat exchanger. The third valve setting may also be configured to (i) couple the first plurality of conduits to the second plurality of conduits and allow coolant within the first plurality of conduits to flow through the second plurality of conduits, (ii) decouple the first plurality of conduits from the second plurality of conduits, (iii) couple the first plurality of conduits to the radiator and allow coolant within the first plurality of conduits to flow through the radiator, and/or (iv) decouple the first plurality of conduits from the radiator.

In another aspect, at least one sensor may be incorporated into the second plurality of conduits, where the sensor monitors a characteristic (e.g., pressure, flow rate) of the coolant. A sensor monitoring subsystem, coupled to the at least one sensor, outputs a first signal when the monitored characteristic is within a preset range of values and outputs a second signal when the monitored characteristic is outside of the preset range of values. The monitored characteristic falls outside of the preset range of values when an object strikes the thermally conductive surface of said battery pack enclosure, causing deformation of the second plurality of conduits. A system controller may be coupled to the sensor monitoring subsystem and a warning indicator, where the system controller is configured to activate the warning indicator when the system controller receives the second signal from the sensor monitoring subsystem. A system controller may be coupled to the sensor monitoring subsystem and configured to modify coolant flow through at least a portion of the second plurality of conduits when the system controller receives the second signal from the sensor monitoring subsystem.

In another aspect, a plurality of thermal vanes (i.e., heat withdrawal fins) may be coupled to the thermally conductive surface of the battery pack enclosure to which the second plurality of conduits are coupled, thereby improving heat removal from the battery pack enclosure.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The terms "battery pack" and "battery pack enclosure" may be used interchangeably and refer to an enclosure containing one or more batteries electrically interconnected to achieve the desired voltage and capacity. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
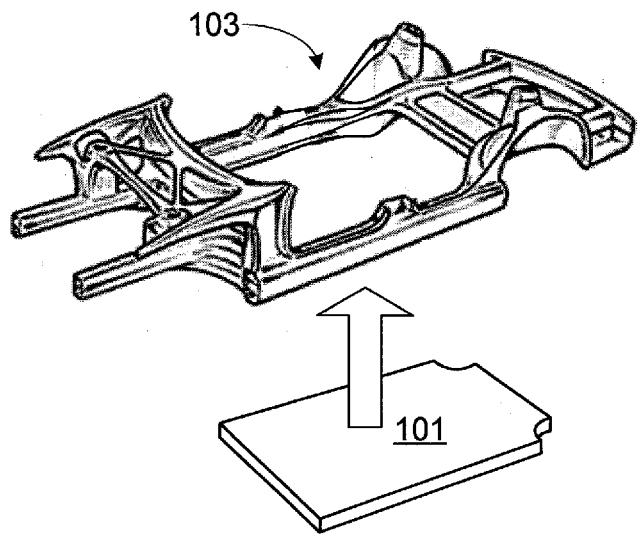
FIG. 1 provides a perspective view of a battery pack and the vehicle chassis to which it is to be mounted.

FIG. 1 provides a perspective view of a battery pack 101 configured to be mounted under vehicle chassis 103. It should be understood that the present invention is not limited to a specific battery pack mounting scheme, battery pack size, or battery pack configuration.

Figure 2:
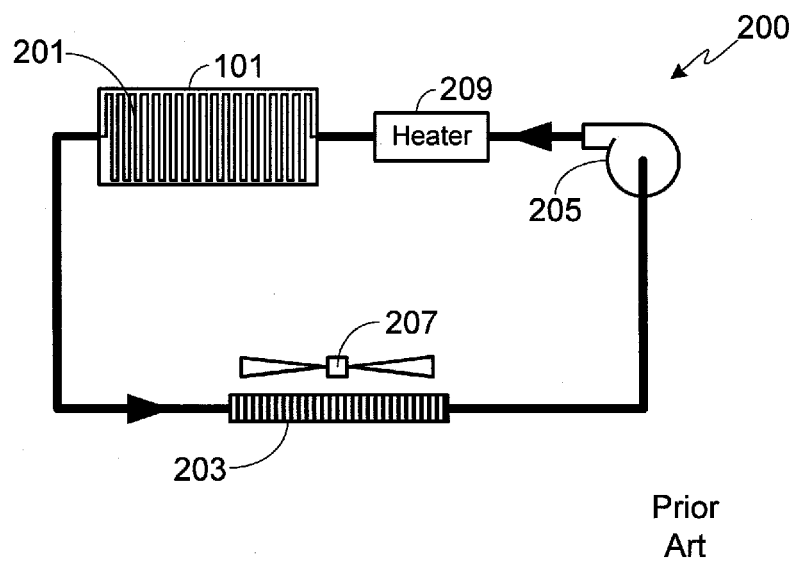
FIG. 2 illustrates an exemplary battery pack cooling system in accordance with the prior art.

FIG. 2 illustrates an exemplary battery thermal management system 200 in accordance with the prior art. In system 200, the temperature of the batteries within battery pack 101 is controlled by pumping a thermal transfer medium, e.g., a liquid coolant, through a plurality of cooling conduits 201 integrated into battery pack 101. Conduits 201, which are fabricated from a material with a relatively high thermal conductivity, are positioned within pack 101 in order to optimize thermal communication between the individual batteries, not shown, and the conduits, thereby allowing the temperature of the batteries to be regulated by regulating the flow of coolant within conduits 201 and/or regulating the transfer of heat from the coolant to another temperature control system. In the illustrated embodiment, the coolant within conduits 201 is pumped through a radiator 203 using a pump 205. A blower fan 207 may be used to force air through radiator 203, for example when the car is stationary or moving at low speeds, thus insuring that there is an adequate transfer of thermal energy from the coolant to the ambient environment. System 200 may also include a heater 209, e.g., a PTC heater, that may be used to heat the coolant within conduits 201, and thus heat the batteries within pack 101. Battery heating via a supplemental heat source 209 or by coupling the battery pack coolant loop to various drive train components (e.g., motor, power inverter, transmission, etc.) may be necessary to maintain battery temperature within the desired operating range, for example when the ambient temperature is too low or during initial vehicle operation.

Figure 3:
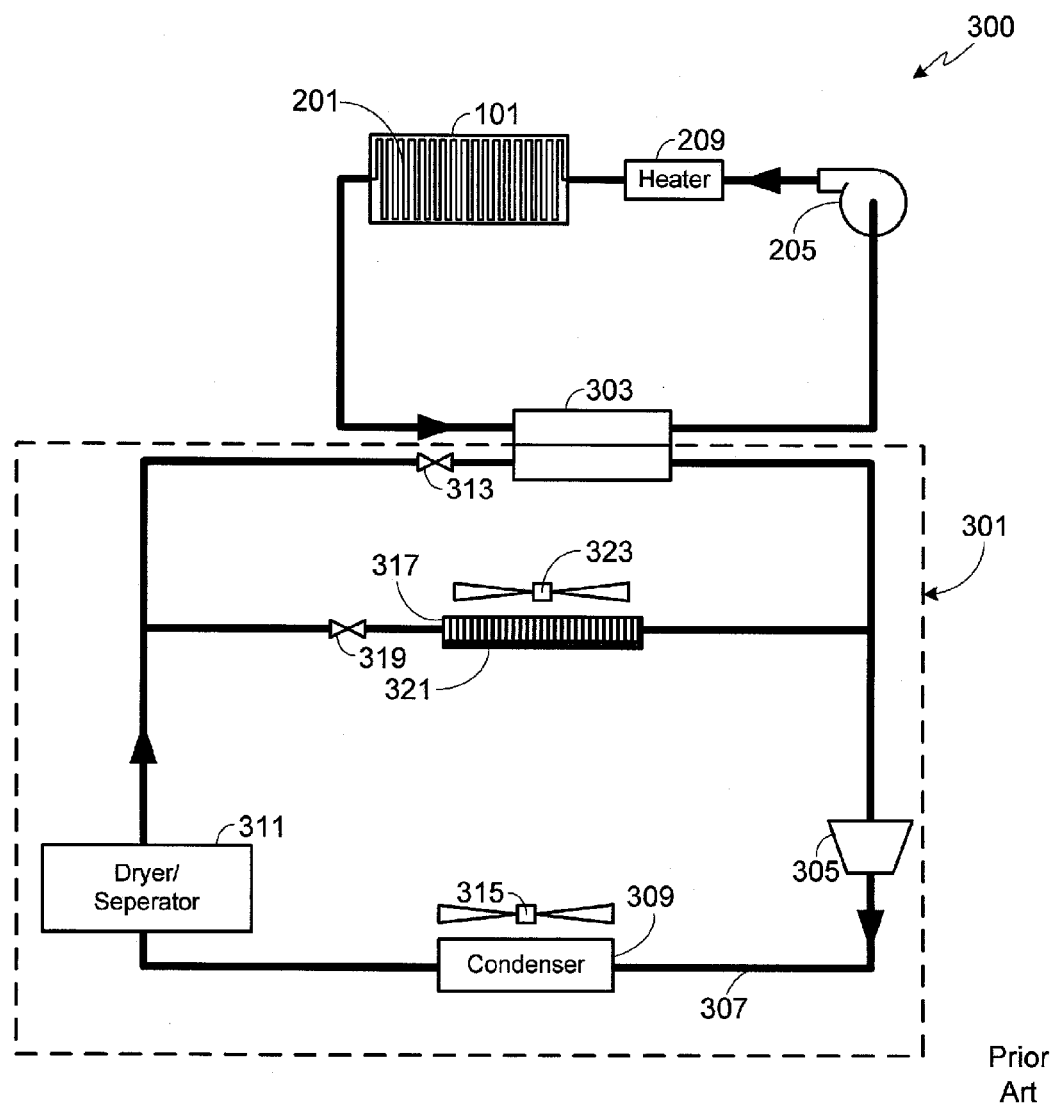
FIG. 3 illustrates an alternate battery pack cooling system in accordance with the prior art.

FIG. 3 illustrates an alternate battery pack thermal management system 300. In system 300 the coolant within conduits 201 is coupled to a secondary thermal management system 301 via a heat exchanger 303. Preferably thermal management system 301 is a refrigeration system and as such, includes a compressor 305 to compress the low temperature vapor in refrigerant line 307 into a high temperature vapor and a condenser 309 in which a portion of the captured heat is dissipated. After passing through condenser 309, the refrigerant changes phases from vapor to liquid, the liquid remaining at a temperature below the saturation temperature at the prevailing pressure. The refrigerant then passes through a dryer 311 that removes moisture from the condensed refrigerant. After dryer 311, refrigerant line 307 is coupled to heat exchanger 303 via thermal expansion valve 313 which controls the flow rate of refrigerant into heat exchanger 303. Additionally, in the illustrated system a blower fan 315 is used in conjunction with condenser 309 to improve system efficiency.

In a typical vehicle configuration, thermal management system 301 is also coupled to the vehicle's heating, ventilation and air conditioning (HVAC) system. In such a system, in addition to coupling refrigerant line 307 to heat exchanger 303, line 307 may also be coupled to the HVAC evaporator 317. A thermal expansion valve 319 is preferably used to control refrigerant flow rate into the evaporator. A heater, for example a PCT heater 321 integrated into evaporator 317, may be used to provide warm air to the passenger cabin. In a conventional HVAC system, one or more fans 323 are used to circulate air throughout the passenger cabin, where the circulating air may be ambient air, air cooled via evaporator 317, or air heated by heater 321.

Figure 4:
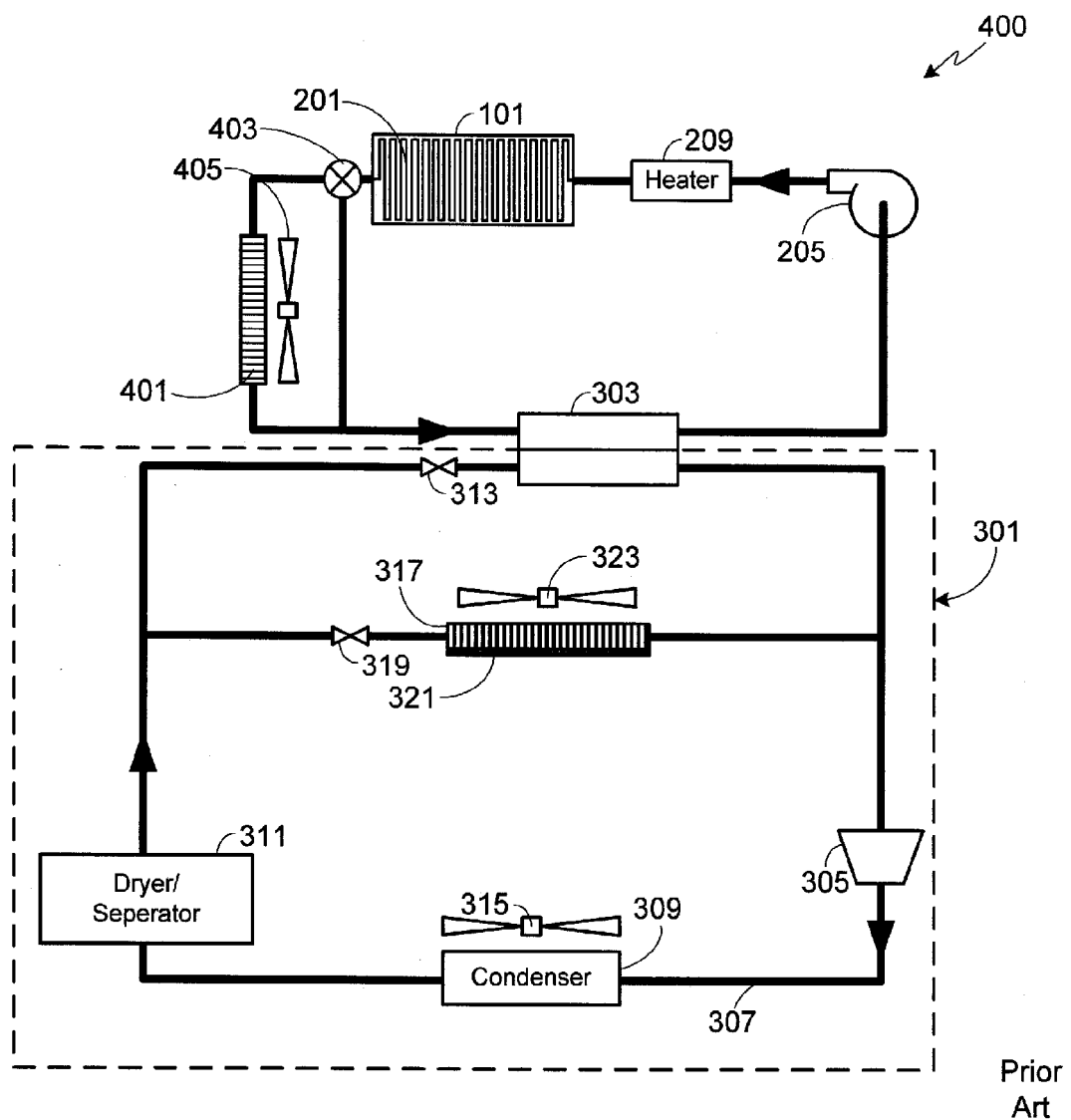
FIG. 4 illustrates an alternate battery pack cooling system in accordance with the prior art, the illustrated system utilizing both a radiator and a heat exchanger as described relative to FIGS. 2 and 3, respectively.

In some electric vehicles, battery pack cooling is accomplished using a combination of a radiator such as that shown in FIG. 2, and a heat exchanger such as that shown in FIG. 3. FIG. 4 illustrates such a conventional cooling system. In system 400, the coolant passing through battery pack 101 via conduits 201 may be directed through either radiator 401 or heat exchanger 303. Valve 403 controls the flow of coolant through radiator 401. Preferably a blower fan 405 is included in system 400 as shown, thus providing means for forcing air through the radiator when necessary, for example when the car is stationary.

Figure 5:
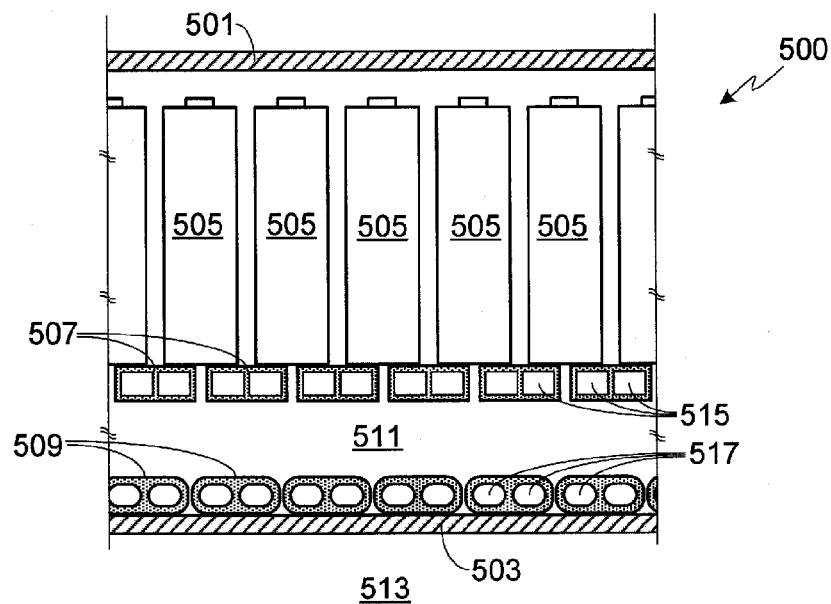
FIG. 5 provides a cross-sectional view of a battery pack in accordance with one embodiment of the invention.

In accordance with the invention, and as illustrated in the cross-sectional view of a portion of exemplary battery pack 500 shown in FIG. 5, two independent sets of cooling conduits are incorporated into the battery pack. Visible in this view is a portion of the upper pack enclosure panel 501, a portion of the lower pack enclosure panel 503, and a plurality of batteries 505. Note that the enclosure side panels are not shown in this view. Batteries 505 are preferably cylindrical batteries as shown, although the invention is equally applicable to batteries utilizing an alternate form-factor. In the illustrated embodiment, batteries 505 utilize an 18650 form-factor and are positioned within battery pack 500 so that the cylindrical axis of each battery is substantially perpendicular to both lower enclosure panel 503 and the surface 506 of the road, shown in phantom. The first set of cooling conduits 507 are thermally coupled to batteries 505 while the second set of cooling conduits 509 are thermally coupled to lower battery pack surface 503. Interposed between the two sets of conduits is a layer 511 of a thermal insulator, thus limiting the unintended transfer of thermal energy from the batteries 505 and the battery cooling conduits 507 to the second set of conduits 509 and the battery pack enclosure. Similarly, thermal insulator 511 limits thermal energy transfer from enclosure 503, the external ambient environment 513, and cooling conduits 509 to the batteries 505 and the battery cooling conduits 507. Layer 511 may be comprised of an air gap or one or more layers of a material with a low thermal conductivity, for example less than 1.0 $Wm^{-1}K^{-1}$ at 25° C., and more preferably less than 0.2 $Wm^{-1}K^{-1}$ at 25° C.

As described above relative to FIGS. 2-4, by regulating the flow of thermal transfer medium, e.g., a coolant, within channels 515 of cooling conduits 507 and/or regulating the transfer of heat from the coolant to another temperature control system, the temperature of cells 505 may be regulated so that the cells remain within their preferred operating range. Similarly, by regulating the flow of coolant within channels 517 of conduits 509, the transfer of thermal energy between the coolant and the battery pack enclosure can be controlled.

Figure 6:
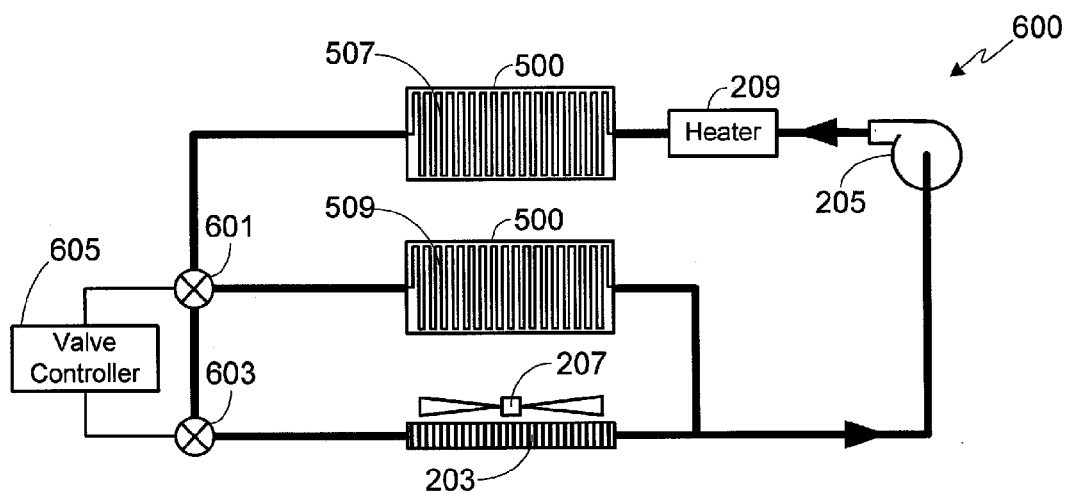
FIG. 6 illustrates a battery pack thermal management system based on the system shown in FIG. 2, modified to utilize the multi-mode cooling system of the invention.

In accordance with the present invention, the large surface area of the battery pack enclosure, and in particular surface 503 of the pack enclosure which is exposed to the ambient environment, is effectively used to transfer heat from the batteries to the environment. It should be understood, however, that this transfer is not a direct transfer, i.e., the cooling conduits used to withdraw heat from the batteries are different from, and independent of, the cooling conduits used to expel heat via the battery pack enclosure. This aspect of the invention is illustrated in FIG. 6, which is based on the thermal management system shown in FIG. 2. Note that in FIG. 6 as well as other system level figures contained herein, the two sets of cooling conduits (e.g., conduits 507 and 509) are shown in the system diagrams as being completely separate even though in actuality, and as illustrated in FIG. 5, the two sets of conduits are both contained within the same battery pack.

In system 600, pump 205 forces coolant through coolant channels 515 of conduits 507 (see FIG. 5). Assuming that heater 209 is not activated and the system is not being used to heat batteries 505, as the coolant passes through conduits 507 heat is withdrawn from the batteries and transferred to the coolant. To expel this thermal energy, in system 600 the coolant then flows through either battery pack conduits 509, radiator 203, or both. Valve 601 regulates the flow of coolant through conduits 509 while valve 603 regulates the flow of coolant through radiator 203. A valve controller 605 controls operation of valves 601 and 603.

When the coolant passes through conduits 509, thermal energy is transferred to the battery pack enclosure, preferably to enclosure panel 503, where it is then transferred to the ambient environment, the effectiveness of which is governed in part by the difference between the temperature of the transfer surface (e.g., pack surface 503) and the ambient temperature. Transfer efficiency is also controlled by the surface area of the involved battery pack surface as well as the velocity of the air passing over the transfer surface. Accordingly, in most instances the faster the EV travels, the better the cooling achieved via cooling conduits 509. Unfortunately in some situations and for some battery pack configurations, cooling the batteries via conduits 509 may be inadequate, for example when the car is traveling at a very slow speeds or stopped for an extended length of time, or if the ambient temperature is too high. In these situations, system 600 can utilize radiator 203. If necessary, blower fan 207 can force air through radiator 203 as previously noted.

One of the advantages of the present invention is that it allows radiator 203 to be reduced in size, since this radiator is only required in those situations when the cooling capacity offered by the surface area of the battery pack and its integrated cooling conduits (e.g., conduits 509) is insufficient to maintain the batteries within their desired operating temperature range. Since radiator 203 typically impacts the aerodynamics of the car, reducing its size can lead to an increased vehicle operating efficiency. Furthermore, during those times when radiator 203 is decoupled from the cooling system, i.e., when valve 603 is closed, baffles (not shown) located in front of the radiator can be closed, thereby further reducing drag and increasing vehicle efficiency.

Figure 7:
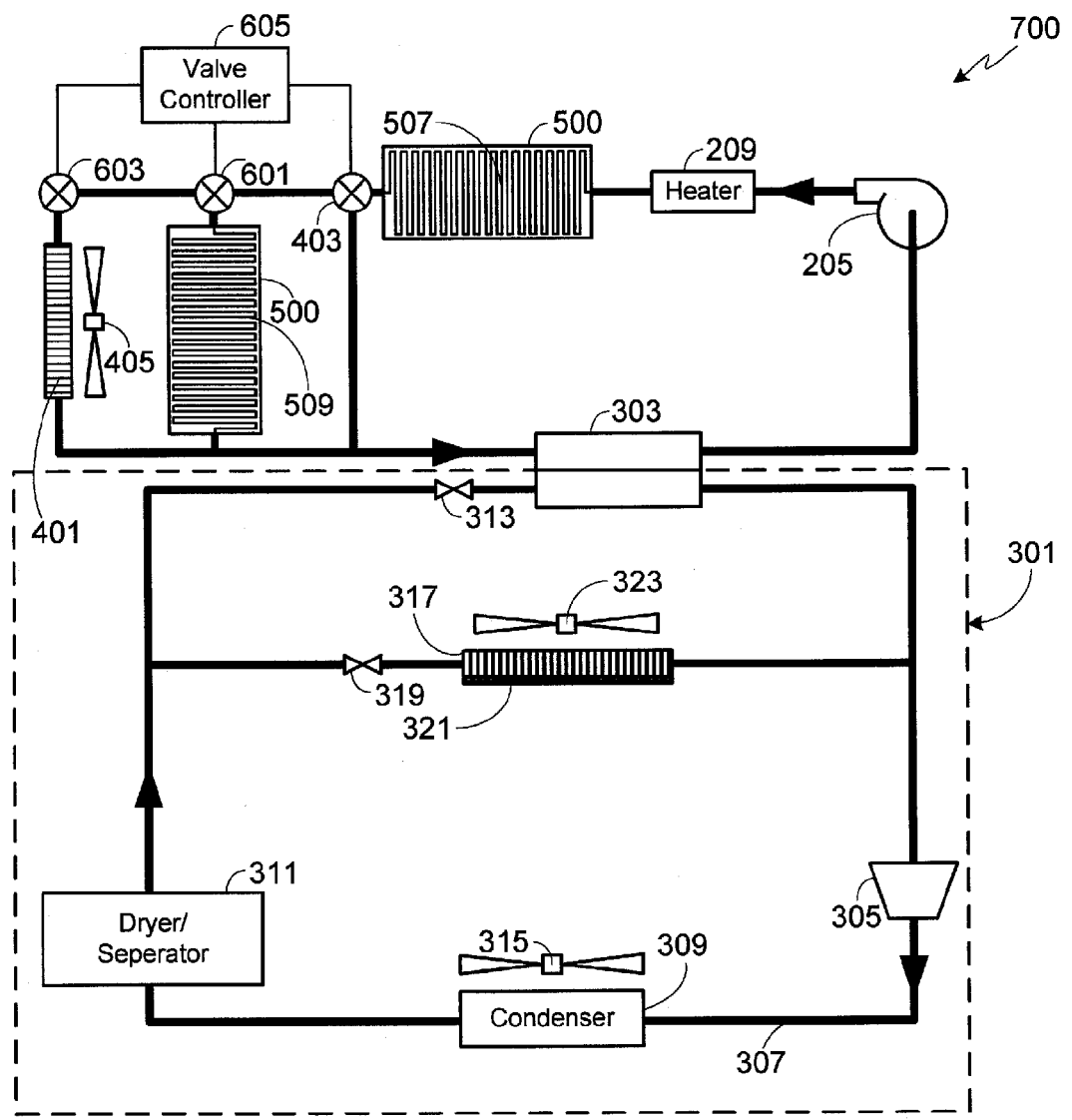
FIG. 7 illustrates a battery pack thermal management system based on the system shown in FIG. 4, modified to utilize the multi-mode cooling system of the invention.

FIG. 7 illustrates another thermal management system, based on system 400, but modified to utilize the multi-mode cooling system of the invention. Note that in system 700 battery cooling is achieved by passing the coolant that has been heated by the batteries through any combination of battery pack conduits 509, radiator 401 and heat exchanger 303. As described previously and as shown in the figure, heat exchanger 303 is coupled to a secondary thermal management system 301, preferably a refrigeration system. Note that valves 403, 601 and 603, along with valve controller 605, determine the flow of coolant through heat exchanger 303, battery cooling conduits 509 and radiator 401, respectively.

Figure 8:
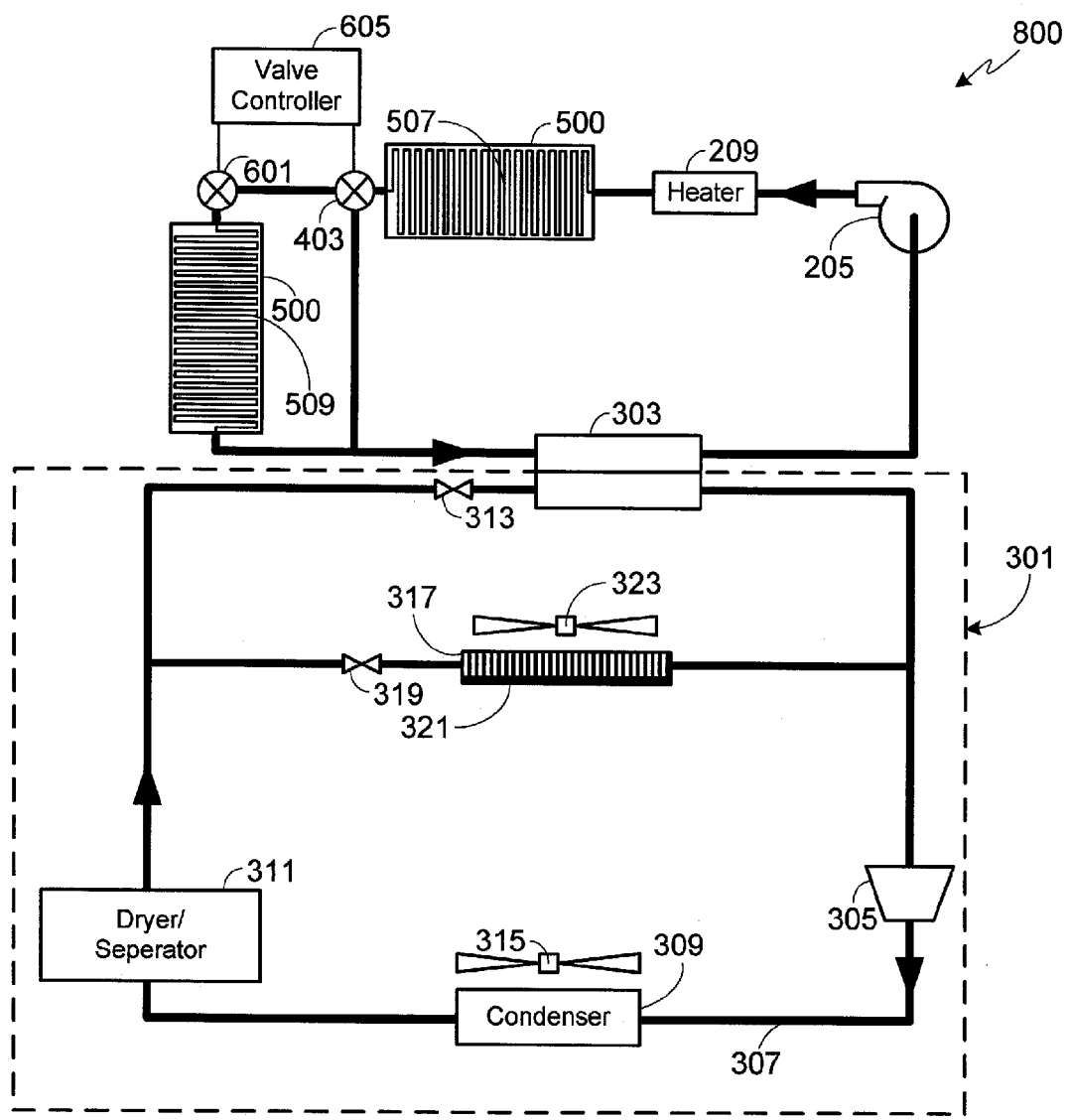
FIG. 8 illustrates a battery pack thermal management system based on the system shown in FIG. 7, modified to eliminate the vehicle's on-board cooling radiator.

In some vehicle/battery pack configurations, heat exchanger 303 alone can be used to augment the cooling provided by battery pack cooling conduits 509. Accordingly, in such a configuration radiator 401 is eliminated, thereby allowing further improvements in both vehicle drag and overall vehicle packaging. FIG. 8 illustrates such a thermal management system 800, based on system 700, in which battery cooling is achieved through a combination of battery pack conduits 509 and heat exchanger 303.

Figure 9:
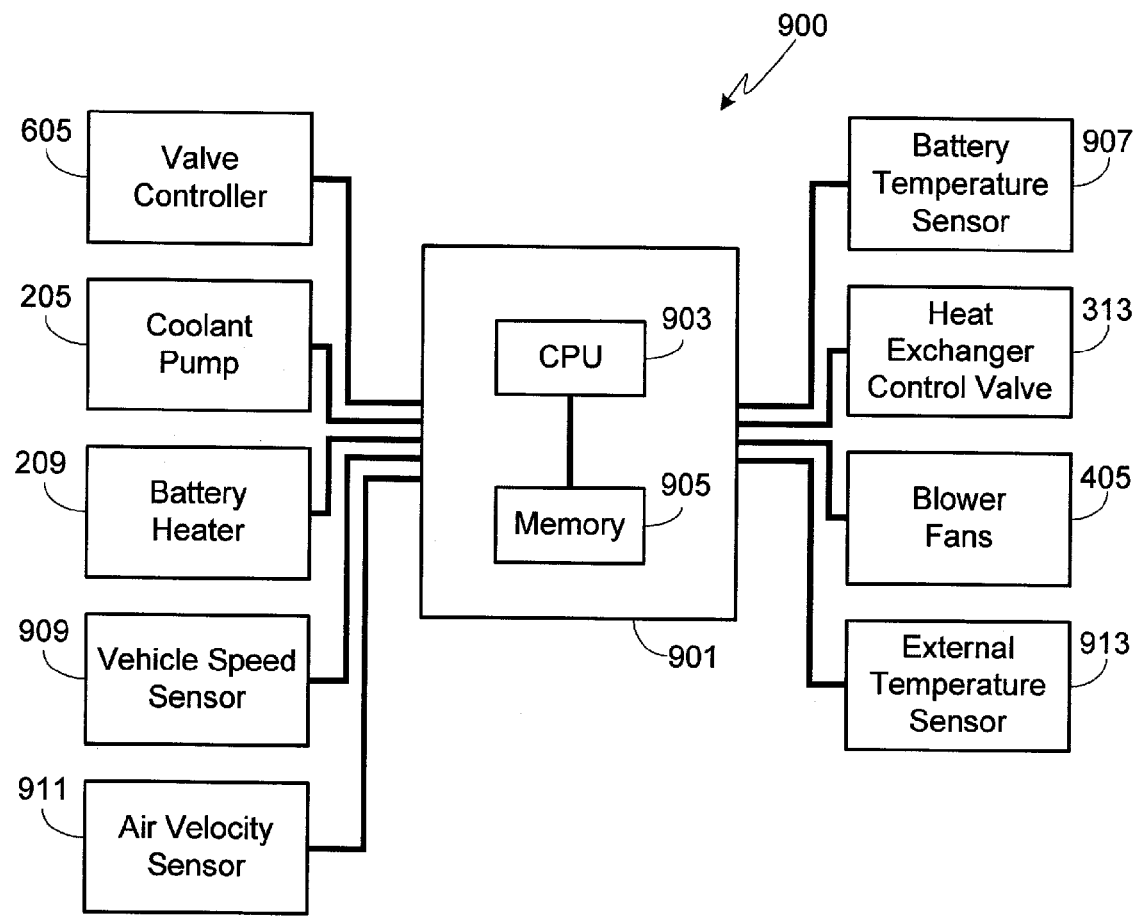
FIG. 9 provides a block diagram of an exemplary control system for use with the invention.

In order to optimize performance of the thermal management system, preferably the system's valve controller, e.g., valve controller 605, is coupled to a system controller 901 as illustrated in exemplary control system 900 shown in FIG. 9. It should be understood that control system 900 is but one possible configuration and that other configurations may be used while still retaining the functionality of the invention. Additionally, one or more of the elements shown in FIG. 9 can be grouped together in a single device, and/or circuit board, and/or integrated circuit.

In system 900, system controller 901 includes a central processing unit (CPU) 903 and a memory 905. Memory 905 may be comprised of EPROM, EEPROM, flash memory, RAM, a solid state disk drive, a hard disk drive, or any other memory type or combination of memory types.

As previously noted, the thermal management system of the present invention is designed to maintain the temperature of the battery pack batteries to within the desired operating range. Accordingly, in a preferred embodiment controller 901 monitors the temperature of the batteries using one or more temperature sensors 907. Based on the monitored temperature, controller 901 adjusts the valves using valve controller 605, coolant flow using pump 205, the cooling provided by heat exchanger 303 using heat exchanger control valve 313, the heating provided by heater 209, and the additional air passing through the radiators (e.g., radiator 401) using the blower fans (e.g., fan 405). In at least one embodiment of the invention, in addition to monitoring battery temperature, controller 901 monitors other vehicle characteristics in order to determine when to alter coolant flow, for example increasing coolant flow through radiator 401 while decreasing coolant flow through battery pack conduits 509. Vehicle characteristics that may be monitored include vehicle speed, for example using speed sensor 909, thus allowing the system to determine when air flow past the battery pack cooling surface (e.g., surface 503) may be insufficient to provide sufficient heat removal from surface 503 and the coolant within conduits 509 to only utilize battery pack conduits 509 to achieve the desired battery coolant temperature. Note that rather than monitoring vehicle speed, air velocity traveling past the battery pack cooling surface may be monitored directly using monitor 911. Controller 901 may also monitor external ambient temperature using sensor 913, thus allowing further optimization of the battery cooling system.

As previously noted, at least one layer of a thermally insulating material (e.g., air layer 511) separates the batteries and the conduits used to cool the batteries (e.g., conduits 507) from the battery pack cooling surface (e.g., surface 503) and the conduits coupled to the battery pack cooling surface (e.g., conduits 509). The thermal isolation provided by this thermally insulating layer is necessary in order to insure efficient battery cooling, and to prevent the unintentional transfer of thermal energy to and from the batteries within the battery pack as well as to and from the battery pack enclosure. It will be appreciated that there are numerous situations in which it is important to thermally isolate the batteries and battery cooling conduits from the pack enclosure. For example, during initial vehicle start-up the batteries may be colder than desired. If the external ambient temperature is too low, it would be very difficult to heat the batteries if the battery pack enclosure was not thermally isolated from the batteries within the pack. Alternately, if the external ambient temperature is too high, it would be difficult to cool the batteries, for example using the heat exchanger and the refrigeration system, if the batteries were not isolated from the battery pack enclosure.

Figure 10:
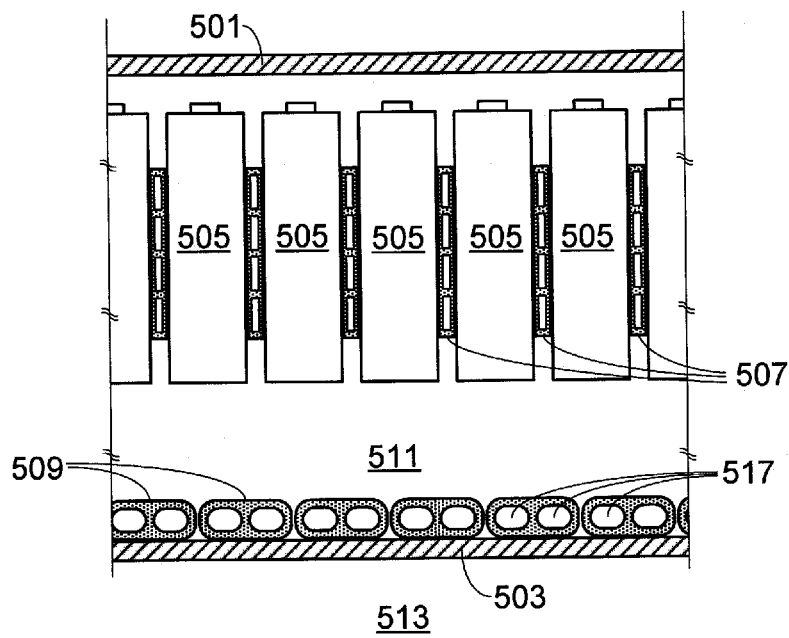
FIG. 10 provides a cross-sectional view of a battery pack in accordance with an alternate embodiment of the invention in which the battery cooling conduits are interposed between the sides of the batteries within the pack.

It should be understood that the present invention is not limited to a specific battery cooling conduit configuration, nor is it limited to a single conduit configuration thermally coupled to the battery enclosure cooling surface. For example, an alternate configuration equally suitable for use with the invention is shown in FIG. 10. In the battery pack cross-sectional view shown in FIG. 10, based on system 500, the battery cooling conduits 507 are thermally coupled and positioned adjacent to the side surface of each battery 505, rather than to the lower surface of each battery 505 as shown in system 500. In yet another alternate configuration that may be used with the invention, the configuration shown in FIG. 11 embeds the battery pack enclosure cooling channels 517 within surface 503. In yet another alternate configuration that may be used with the invention, the configuration shown in FIG. 12 incorporates thermal vanes 1201 into the exposed surface of battery pack enclosure cooling surface 503, vanes 1201 providing enhanced heat withdrawal from the pack surface 503. Vanes 1201 may either be formed as part of enclosure panel 503, for example using an extrusion process, or attached to the exterior surface of panel 503 by welding, brazing, bonding or other fastening means (e.g., bolts). Preferably thermal vanes 1201 run parallel to the lengthwise direction of the car, thus enhancing heat withdrawal as the car moves forward.

Figure 11:
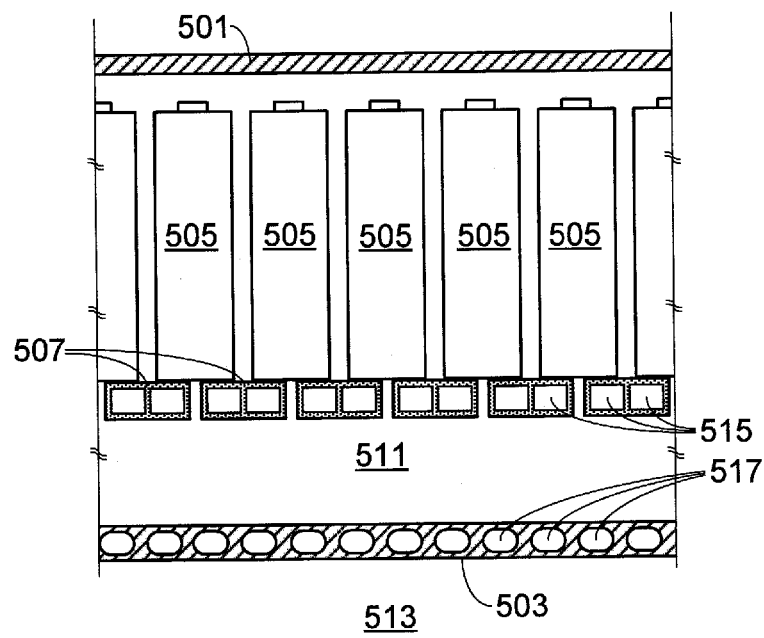
FIG. 11 provides a cross-sectional view of a battery pack in accordance with an alternate embodiment of the invention in which the conduits thermally coupled to the battery pack's cooling surface are incorporated within an enclosure wall.
Figure 12:
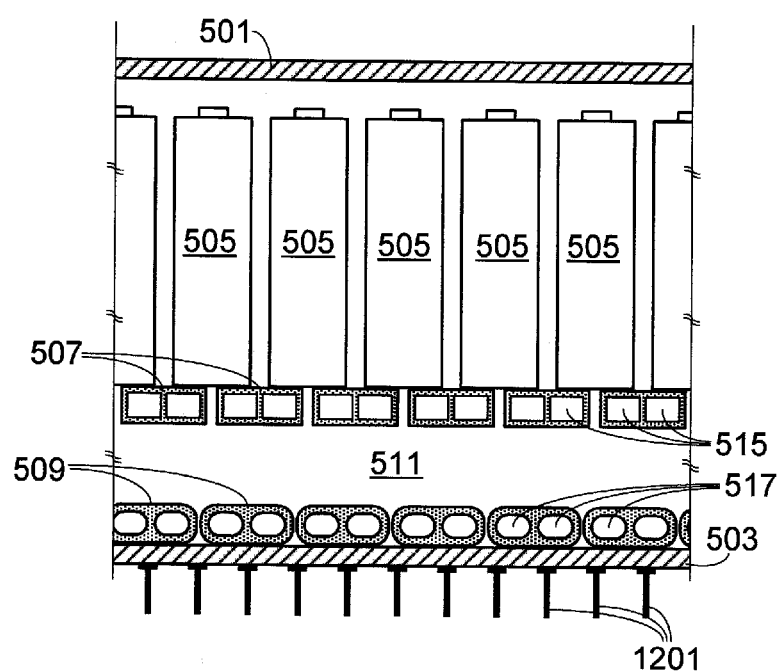
FIG. 12 provides a cross-sectional view of a battery pack in accordance with an alternate embodiment of the invention in which thermal vanes are incorporated into the exposed surface of battery pack enclosure cooling surface to enhance heat withdrawal.

In addition to providing an efficient technique for managing the temperature of the batteries within the vehicle's battery pack, the present invention may also be used to provide enhanced protection of the batteries. Specifically, when an object such as a piece of road debris strikes the battery pack's lower surface, which is adjacent to the road surface, conduits 509 help to prevent catastrophic damage to the pack by absorbing energy through conduit deformation. If the battery cooling conduits 507 are positioned adjacent to the lowermost surface of each battery as shown in FIGS. 5, 11 and 12, conduits 507 will also deform when an object strikes the bottom of the battery pack, thereby further increasing battery pack protection. As the lower panel 503, battery pack conduits 509 and battery cooling conduits 507 deform, energy is absorbed. If sufficient energy is absorbed through the process of deforming the lower panel 503, battery pack conduits 509 and battery cooling conduits 507, damage to the batteries 505 within the strike region can be significantly limited if not altogether eliminated, thereby potentially averting a thermal runaway event. Preferably conduits 507 and 509 are fabricated from polyethylene or a similar material which is capable of severe deformation without cracking or breaking. Additionally, by selecting an electrically non-conductive coolant, if either conduits 507 or 509 do crack or break when deformed, the released coolant will not cause a short within the battery pack. Additional details with respect to deformable conduits are provided in co-assigned U.S. patent application Ser. No. 14/083,476, filed 19 Nov. 2013, and Ser. No. 14/132,179, filed 18 Dec. 2013, the disclosures of which are incorporated herein for any and all purposes.

In addition to providing protection to the batteries within the battery pack, by incorporating pressure or flow sensors within battery pack conduits 509, when an object strikes bottom panel 503 and deforms the lowermost set of cooling conduits (e.g., conduits 509), the change in coolant pressure or flow rate provides an early warning that the battery pack has been struck with sufficient force to potentially compromise the battery pack and cause the initiation of a thermal runaway event. It will be appreciated that sensors, either pressure or flow rate sensors, may also be incorporated into battery cooling conduits 507, thus helping to determine the severity of an impact, i.e., an impact that affects both sets of conduits will typically be more severe than an impact that only affects the lowermost set of conduits 509.

Figure 13:
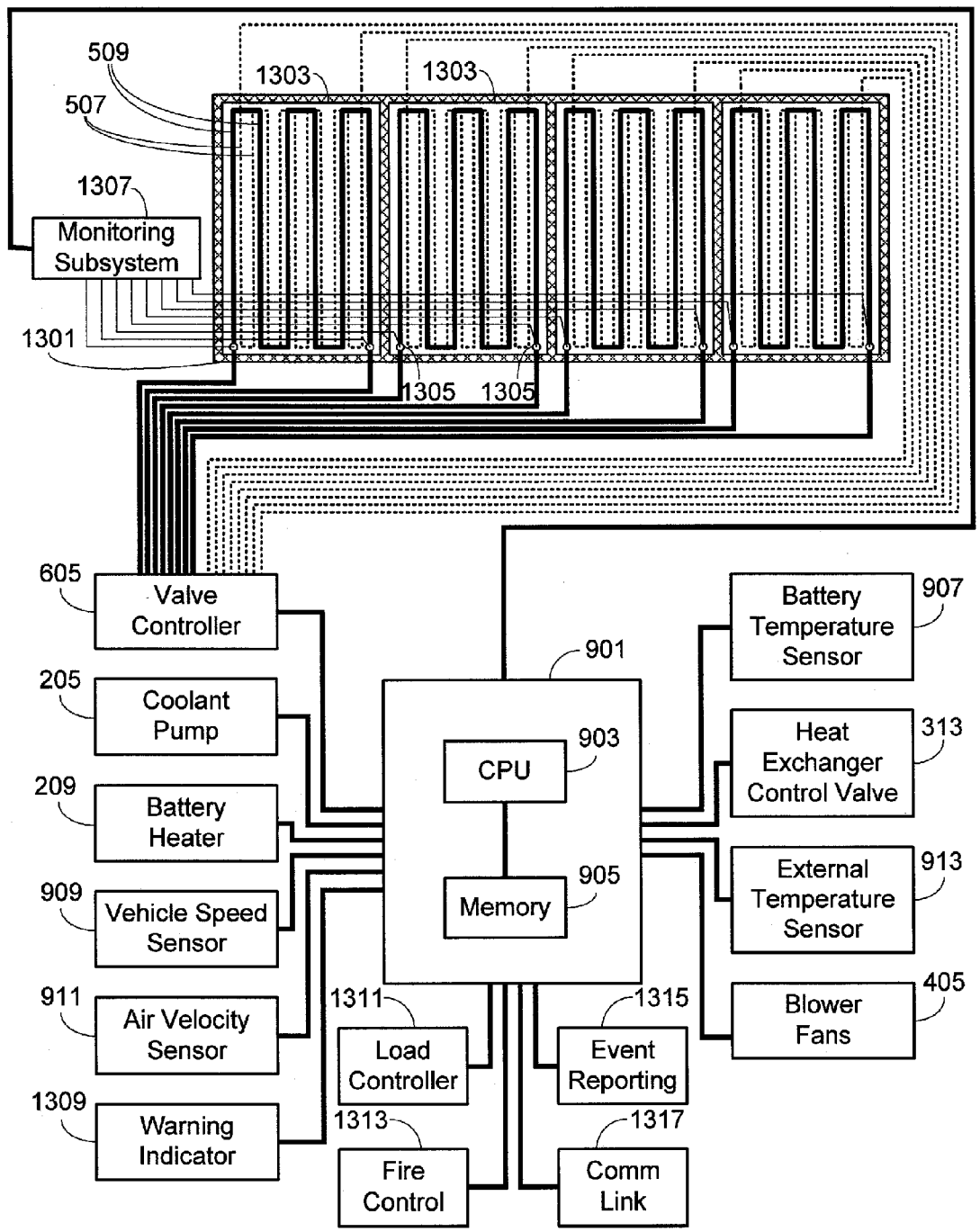
FIG. 13 provides a block diagram of the exemplary control system shown in FIG. 9, modified to include a conduit deformation monitoring system.

FIG. 13 illustrates an exemplary control system based on the system shown in FIG. 9, modified to include a plurality of pressure or flow sensors within battery pack conduits 509. To insure clarity in FIG. 13, batteries are not shown within battery pack enclosure 1301 and only a few battery pack conduits 509 and a few battery cooling conduits 507 are shown, although it will be understood that in a typical battery pack, a much greater density of each type of conduit is used to provide adequate battery cooling and heat withdrawal. Note that in FIG. 13 pressure and/or flow sensors are only incorporated into conduits 509 even though sensors may be incorporated into both sets of conduits as described above. Furthermore it should be understood that the number and location of the conduit sensors depends, at least in part, on the configuration of the conduits.

In the exemplary embodiment shown in FIG. 13, battery pack 1301 includes four battery modules 1303. Each module 1303 includes a plurality of batteries (not shown), interconnected to provide the desired power levels for the vehicle to which battery pack 1301 is mounted. For purposes of clarity, battery interconnects and battery mounts are not included in this view. In the illustrated embodiment, each battery module 1303 includes a single battery cooling loop 507 and a single battery pack loop 509, although the control system of the invention is equally applicable to other configurations.

In the embodiment shown in FIG. 13, coolant flow and/or pressure within each battery pack loop 509 is monitored by two sensors 1305. The output signal from each sensor 1305 is monitored using subsystem 1307 which, in turn, is monitored by controller 901. If desired, the functionality of subsystem 1307 may be integrated into controller 901.

Preferably when one of the sensors 1305 signals a change in the flow of coolant or the pressure within a coolant conduit 509, controller 901 compares the current flow/pressure with a range of acceptable flows/pressures stored in memory 905. If the flow rate or pressure is still within the acceptable range, controller 901 treats the change as a non-event. In some embodiments, the system is configured to alter the range of acceptable flows/pressures depending upon the current cooling system operating conditions and the use of conduits 509 versus radiator 401 and/or heat exchanger 303.

Since a change in the coolant flow rate or pressure, as detected by sensors 1305, may be indicative of an obstacle striking the lower battery pack enclosure panel with sufficient force to deform a portion of a cooling conduit 509, in at least one embodiment of the invention controller 901 is configured to perform one or more tasks upon detection of an out-of-range reading of one of the sensors 1305. Alternately, controller 901 may be configured to determine the potential severity of the impact based on the current flow rate/pressure, or based on the amount that the flow rate/pressure changes, and then perform one or more tasks based on the determined severity. For example, a minor change that yields a sensor reading that is not within the acceptable range may only warrant activation of a warning indicator. In contrast, a major change, such as termination of coolant flow, may be deemed a severe event and require controller 901 to make adjustments to the cooling system, the battery load, etc. Details of possible responses to be performed by controller 901 upon detection of battery pack damage are provided below. It will be appreciated that controller 901 may be programmed to perform a single response or multiple responses and in the case of multiple responses, they may be performed either serially or in parallel.

Upon detection of a battery pack impact, as determined by controller 901 based on the monitored coolant flow and/or pressure as detected by one or more sensors 1305, the system may be configured to activate a warning indicator 1309. Preferably controller 901 is configured to activate warning indicator 1309 regardless of the severity of the impact, i.e., regardless of the change in coolant flow and/or pressure as monitored by sensors 1305 and determined by subsystem 1307 or controller 901. Warning indicator 1309 may be a sound emitted over the vehicle's sound system or through a dedicated sound system. Alternately, or in addition to an audible sound, warning indicator 1309 may use a visual indicator located in the dashboard or instrument panel.

Controller 901 may be configured to make any of a variety of adjustments to the battery pack cooling system depending upon the severity of the damage to the battery pack cooling conduits 509 as well as the configuration of the battery pack and corresponding cooling system. For example, if a relatively minor change in battery coolant flow and/or pressure within conduits 509 is detected representative of a relatively minor deformation, then controller 901 may be configured to decrease cooling provided by conduits 509 and increase the cooling provided by radiator 401 and/or heat exchanger 303 using valve controller 605, thereby helping to maintain batteries 505 within their desired operating temperature range. If the damage to the conduits 509 is extensive and indicative of a pierced or broken conduit, controller 901 may be configured to isolate the damaged portion of conduit 509, or completely rely on alternative cooling (e.g., radiator 401, heat exchanger 303), thereby helping to prevent battery pack flooding and the loss of coolant.

After detecting an impact on the battery pack as evidenced by a change in coolant flow or pressure within the cooling conduits 509, controller 901 may be configured to alter the electrical load on the batteries using load controller 1311. While reducing the load on the batteries will affect the performance of the electric vehicle utilizing battery pack, load reduction may help to prevent any of the batteries within the pack from entering into thermal runaway.

In some embodiments the system controller 901 may be configured to activate a fire control system 1313 when a battery pack impact is detected. The fire control system 1313, which may utilize either a gas or liquid fire retardant or suppressive agent, is intended to minimize the potential risk of one or more of the batteries within the battery pack undergoing thermal runaway due to the impact.

In addition to notifying the vehicle's occupants of a battery pack impact via warning indicator 1309, in at least one embodiment controller 901 is configured to report the event using reporting system 1315. Reporting system 1315 may simply record the event using an on-board system, for example memory 905, thus allowing service personnel to help determine the extent of damage, damage timing, and the efficacy of the damage monitoring system. Alternately, reporting system 1315 may be configured to externally report the event, preferably reporting not just the occurrence of the event, but also event characteristics. Reporting may be sent to the manufacturer, a service representative or other third part. Alternately, reporting may be to a web site, a web-based application, or a remote home-based system. Alternately, reporting may be to the vehicle's owner or another party via a text message or other format. Typically controller 901 will use mobile telecommunications link 1317 to externally report an event, where telecommunications link 1317 may utilize any of a variety of different standards including, but not limited to, GSM EDGE, UMTS, CDMA2000, DECT, and WiMAX.

Additional details with respect to the incorporation of pressure or flow sensors within the conduits contained in a battery pack are provided in co-assigned U.S. patent application Ser. Nos. 14/132,560 and 14/133,354, both filed 18 Dec. 2013, the disclosures of which are incorporated herein for any and all purposes.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A battery pack thermal management system, comprising:
   a battery pack enclosure mounted to an electric vehicle, wherein said battery pack enclosure is configured to house a plurality of batteries;
   a first plurality of conduits adjacent to and thermally coupled to said plurality of batteries;
   a second plurality of conduits thermally coupled to at least one thermally conductive surface of said battery pack enclosure;
   a thermal insulator interposed between said first plurality of conduits and said second plurality of conduits;
   a radiator, wherein said radiator is mounted to said electric vehicle and remotely located relative to said battery pack enclosure; and
   a valve controller, wherein said valve controller has at least a first valve setting and a second valve setting, wherein said first valve setting couples said first plurality of conduits to said second plurality of conduits and allows a coolant within said first plurality of conduits to flow through said second plurality of conduits, wherein said first valve setting decouples said first plurality of conduits from said radiator, wherein said second valve setting couples said first plurality of conduits to said second plurality of conduits and allows said coolant within said first plurality of conduits to flow through said second plurality of conduits, and wherein said second valve setting couples said first plurality of conduits to said radiator and allows said coolant within said first plurality of conduits to flow through said radiator.

2. The battery thermal management system of claim 1, wherein said second valve setting modifies coolant flow from said first plurality of conduits through said second plurality of conduits.

3. The battery thermal management system of claim 1, wherein said valve controller has a third valve setting, and wherein said third valve setting couples said first plurality of conduits to said radiator and allows said coolant within said first plurality of conduits to flow through said radiator, and wherein said third valve setting decouples said first plurality of conduits from said second plurality of conduits.

4. The battery thermal management system of claim 1, further comprising a refrigeration subsystem and a heat exchanger, wherein said refrigeration subsystem is coupled to said heat exchanger.

5. The battery thermal management system of claim 4, wherein said valve controller has a third valve setting, wherein said third valve setting couples said first plurality of conduits to said heat exchanger and allows said coolant within said first plurality of conduits to flow through said heat exchanger, wherein said refrigeration subsystem is in thermal communication with said coolant within said first plurality of conduits via said heat exchanger when said valve controller is in said third valve setting.

6. The battery thermal management system of claim 4, wherein said coolant within said first plurality of conduits flows through said heat exchanger.

7. The battery thermal management system of claim 6, wherein said valve controller has a third valve setting, wherein said third valve setting increases a flow rate of a refrigeration subsystem refrigerant through said heat exchanger.

8. The battery thermal management system of claim 7, wherein said third valve setting couples said first plurality of conduits to said second plurality of conduits and allows said coolant within said first plurality of conduits to flow through said second plurality of conduits.

9. The battery thermal management system of claim 7, wherein said third valve setting decouples said first plurality of conduits from said second plurality of conduits.

10. The battery thermal management system of claim 7, wherein said third valve setting couples said first plurality of conduits to said radiator and allows said coolant within said first plurality of conduits to flow through said radiator.

11. The battery thermal management system of claim 7, wherein said third valve setting decouples said first plurality of conduits from said radiator.

12. The battery thermal management system of claim 6, wherein said valve controller has a third valve setting, wherein said third valve setting decreases a flow rate of a refrigeration subsystem refrigerant through said heat exchanger.

13. The battery thermal management system of claim 12, wherein said third valve setting couples said first plurality of conduits to said second plurality of conduits and allows said coolant within said first plurality of conduits to flow through said second plurality of conduits.

14. The battery thermal management system of claim 12, wherein said third valve setting decouples said first plurality of conduits from said second plurality of conduits.

15. The battery thermal management system of claim 12, wherein said third valve setting couples said first plurality of conduits to said radiator and allows said coolant within said first plurality of conduits to flow through said radiator.

16. The battery thermal management system of claim 12, wherein said third valve setting decouples said first plurality of conduits from said radiator.

17. The battery thermal management system of claim 4, wherein said refrigeration subsystem further comprises a refrigerant, a compressor, a condenser and a thermostatic expansion valve.

18. The battery thermal management system of claim 4, further comprising a vehicle heating, ventilation and air conditioning subsystem coupleable to said refrigeration subsystem.

19. The battery thermal management system of claim 1, wherein said thermal insulator is comprised of a layer of a thermally insulating material with a thermal conductivity of less than 1.0 $Wm^{-1}K^{-1}$ at 25° C.

20. The battery thermal management system of claim 1, wherein said plurality of batteries are comprised of rows of batteries, and wherein said first plurality of conduits are positioned between adjacent rows of batteries.

21. The battery thermal management system of claim 1, wherein said first plurality of conduits are interposed between said plurality of batteries and said thermal insulator.

22. The battery thermal management system of claim 1, wherein said second plurality of conduits are incorporated within an exterior wall of said battery pack enclosure, and wherein said at least one thermally conductive surface of said battery pack enclosure corresponds to an exterior surface of said exterior wall.

23. The battery thermal management system of claim 1, wherein said second plurality of conduits are configured to deform and absorb impact energy when an object strikes said thermally conductive surface of said battery pack enclosure.

24. The battery thermal management system of claim 1, further comprising:
  at least one sensor incorporated into said second plurality of conduits, wherein said at least one sensor monitors a characteristic of said coolant; and
  a sensor monitoring subsystem coupled to said at least one sensor, wherein said sensor monitoring subsystem outputs a first signal when said characteristic monitored by said at least one sensor is within a preset range of values and outputs a second signal when said characteristic monitored by said at least one sensor is outside of said preset range of values, and wherein deformation of said second plurality of conduits due to an object striking said thermally conductive surface of said battery pack enclosure causes said characteristic monitored by said at least one sensor to fall outside of said preset range of values.

25. The battery thermal management system of claim 24, further comprising a warning indicator and a system controller, wherein said system controller is coupled to said warning indicator and to said sensor monitoring subsystem, and wherein said system controller activates said warning indicator when said system controller receives said second signal from said sensor monitoring subsystem.

26. The battery thermal management system of claim 24, further comprising a system controller coupled to said sensor monitoring subsystem, wherein said system controller is configured to modify coolant flow through at least a portion of said second plurality of conduits when said system controller receives said second signal from said sensor monitoring subsystem.

27. The battery thermal management system of claim 1, further comprising a plurality of thermal vanes coupled to said at least one thermally conductive surface of said battery pack enclosure.

28. The battery thermal management system of claim 1, wherein said first plurality of conduits are separated from said second plurality of conduits by a gap, wherein said gap is filled with said thermal insulator, and wherein said thermal insulator is comprised of air.

* * * * *